Patented Nov. 21, 1944

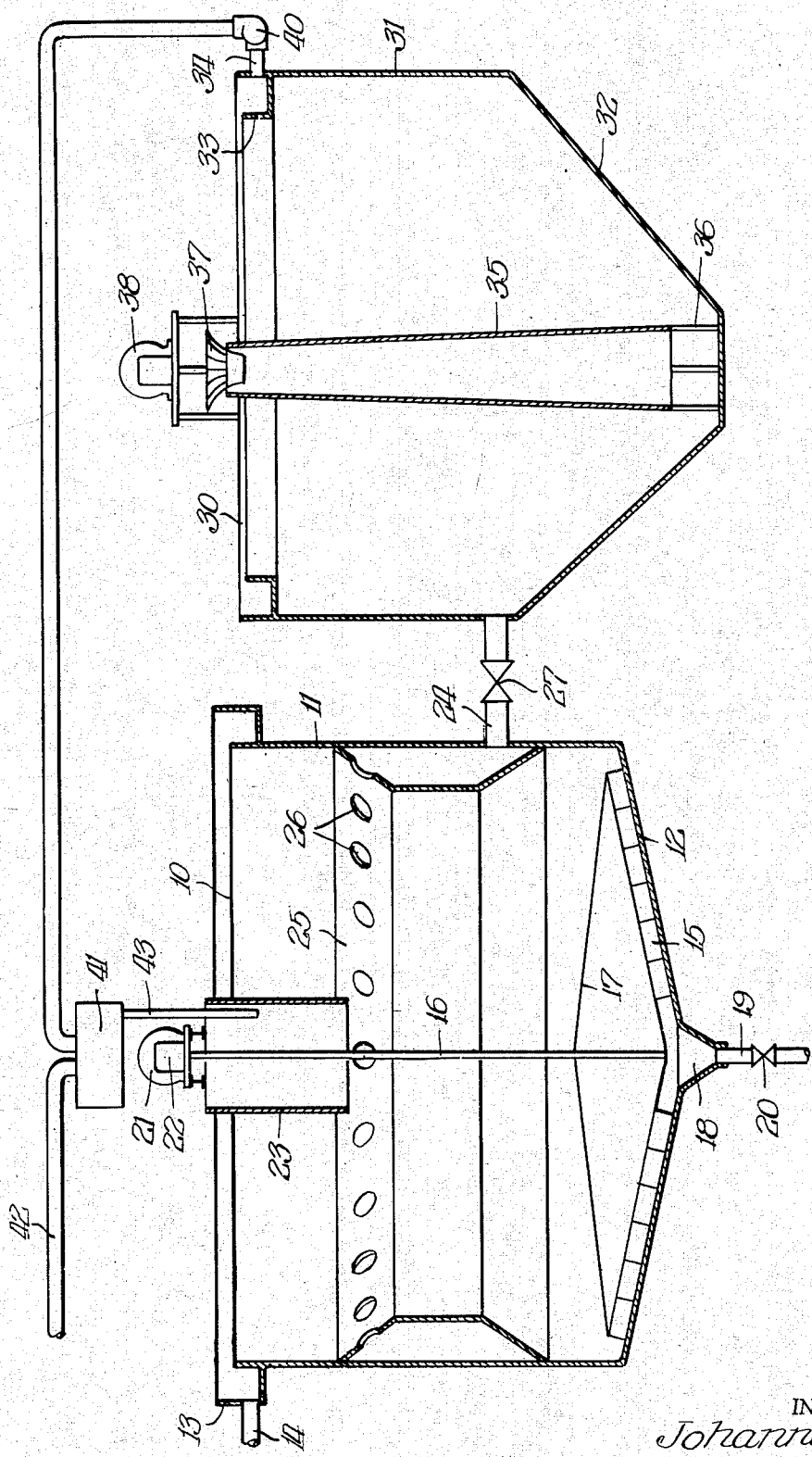

2,363,176

UNITED STATES PATENT OFFICE 2,363,176

SEWAGE TREATMENT PROCESS AND APPARATUS

Johanna Gunz, Chicago, Ill., assignor to Infilco Incorporated, a corporation of Delaware Application August 11, 1941, Serial No. 406,265

10 Claims. (Cl. 210—8)

This invention relates to the biological treatment of sewage, industrial waste and other impure liquids and particularly to the treatment of municipal sewage. More specifically, it relates to the treatment of such liquids by what is generally called the activated sludge process.

It is a principal object of my invention to simplify such process and to cut down its cost considerably.

It is another object of my invention to improve the operation of an activated sludge plant by a new combination of biological treatment, dilution and sedimentation.

Another object is to improve the activity of the microorganisms favorable for the process while preventing the growth of large numbers of unfavorable microorganisms.

Still another object is to provide a flexible system which can readily be adjusted to the varying conditions of the sewage flow and to the various standards of purification requirements.

A still further object is to improve the removal of sewage solids by sedimentation.

The activated sludge system of the prior art generally provides a primary settler, an aerator and a final settler, the flow of the sewage being through the three tanks in the sequence as stated. The major part of the sludge separated in the final settler is returned to the aerator as so-called "return sludge," while the minor part, the so-called "excess sludge," (because it is in excess of what can be re-used in the aerator), is either sent directly to waste or passed back into the primary settler where it mixes and settles together with the raw sludge settling therein.

The requirement of three large tanks for the several steps of the process, each of which needs large and intricate equipment, makes the conventional activated sludge process very expensive. It is one of the objects of my invention to eliminate one of the successive steps of the process and the tank needed for it and thereby to considerably simplify the process and cut down the original cost of the treating plant and also the expense of its operation.

One of the main drawbacks of the activated sludge process is that it requires a settling period of at least two hours in the final settler. Frequently considerably longer detention periods are used before the sludge is returned from the final settler to the aerator. During such settling and storage periods the sludge is deteriorating rapidly by anaerobic action. Such action, which is due to the presence of microorganisms of the anaerobic or septic kind, is self starting under anaerobic conditions and is directly opposed to the aerobic biological action of the aerator, which is required for that process. The deterioration of the sludge is sometimes carried so far that the sludge has to be reactivated, at considerable expense for equipment and power, before it can be used again in the aerator. It is one of the principal objects of my improved process to overcome such difficulties and to do away with such settling and storing and their bad effect on the process.

The primary tank of a conventional activated sludge plant has to provide sufficient capacity for the treatment of the maximum flows. At night and at other times of low sewage flow the primary tank contains a stagnant body of sewage. This sewage, as well as the sludge settling from it, tends to become septic and a large amount of such septic material enters the aeration tank upon resumption of normal flow, thus seriously affecting the conditions therein. It is an object of my improved process to have a large and controllable flow through the preliminary tank at all times and to provide for great quantities of active aerobic material in said tank.

Still other objects of my invention will appear from the following detailed description of my improved process.

More specifically, I propose to carry out an activated sludge process in a treatment tank and an aerator but without any final settler following the aerator for the separation of the activated sludge and the clarified supernatant from the mixed aerator liquor. Whereas such final settler has heretofore been thought an essential part of the process I have found that the process can be operated without a final settler with as satisfactory, and in some respects with better, results.

In my process the raw sewage flows into the treatment tank together with a large body of fresh previously aerated liquid. This body of liquid has previously passed through the aerator and is rich in active aerobic bacteria and in solids which have been coagulated by aeration and mineralized by the action of the bacteria. A great part of the aerobic treatment which in the conventional process is carried out in the aerator is taken over in my process by the treatment tank while the liquid undergoes clarification. Moreover, instead of providing the aerator with a sludge which has been settled and stored for several hours and as a consequence of such settling and storing lost much of its ability to purify the sewage to be treated by it, I send into the aerator a mixture of fresh sewage and freshly aerated solids and I withdraw such mixture from the treatment tank at a point where its solids content is of proper concentration for the further treatment in the aerator. The conditions in the aerator of my process are thus much improved in various respects over those in an aerator of an activated sludge plant as heretofore known. The sewage entering the aerator is already, to a considerable extent, pretreated by the mixing of the entire aerator effluent with raw sewage, whereby there is secured a large amount of active aerobic bacteria in the treatment tank. Great quantities of such bacteria reenter the aerator in admixture with the sewage to be treated as I establish a continuous circulation between the treatment tank and the aerator of a magnitude which is a multiple of the throughput flow, and these bacteria enter the aerator before their activity has been reduced by settling and storing. Furthermore, in the conventional process, clarified effluent of a preliminary settler and settled sludge of a final settler are passed into the aerator and the settled sludge has to be re-suspended and kept in suspension in the clarified effluent. It is well known that it is difficult and requires much time and power to resuspend solids and keep them in a proper condition once they have been allowed to settle out of the liquid, and that such solids even when re-suspended have lost much of their capacity as flocculating means. I, therefore, save power and detention time and I improve flocculation in the aerator by providing it with a suitably concentrated suspension of pretreated sewage containing activated solids.

In a similar way the conditions in the clarification tank of my process are superior to those in a preliminary settler of the usual activated sludge plant. The clarification is improved, the large mass of recirculated mixed liquor with its rich contents of well flocculated suspended solids forming a powerful aid therefor. At the same time the recirculation flow can be adjusted to the flow conditions of the raw sewage so that even at the times of lowest sewage flows there, will arise no stagnant condition causing septicity. Septic conditions are furthermore prevented in the treatment tank by the mass of active aerobic bacteria in the recirculation flow which impart considerable aerobic digestion to raw sewage as soon as they are fed with the raw sewage solids.

These and other advantages of my improved process of sewage treatment will be more clearly understood on consideration of the following detailed description and the drawing appended, which shows a vertical cross section of the preferred embodiment of my invention.

The apparatus comprises a clarification chamber 10, which may be of any suitable size or shape, such as a basin with a vertical wall 11 and the gently sloping bottom 12. The clarification chamber may be similar to those ordinarily used in that it is provided with an effluent launder 13, communicating with an effluent conduit 14, for removal of clarified liquid from the system. Preferably, the clarification chamber will be provided with sludge rakes 15, suspended from a shaft 16 by any suitable means such as braces 17, and adapted to move sedimented solids to a sludge sump 18 in the floor 12. A sludge conduit 19 leads from the sludge sump 18 and is provided with a valve 20 to control the removal of sedimented solids to waste. The shaft 16 of the raking mechanism can be rotated by any suitable means, such as a motor 21 and a reducer 22. As is also common in an apparatus of this type, I prefer that sewage to be treated be introduced into a central loading well 23 which may comprise an open-end cylinder or other baffle means descending within the tank and adapted to direct the flow of incoming liquid downwardly.

The clarification chamber of my apparatus will differ from that customarily used in that mine provides a third withdrawal conduit 24 adapted to remove a large portion of liquid from the clarification tank together with a major portion of the finer suspended particles contained therein. For this purpose I show a partition 25 provided with a plurality of inlets 26, preferably extending around the diameter of the tank so that solids and liquid are withdrawn from all portions of the tank. It will be obvious to those skilled in the art that other suitable withdrawal means can be provided within the clarifier 10, it being understood that it is desired to withdraw a large portion of liquid with a large portion of the finer suspended solids which will be contained therein.

The third withdrawal line 24 may be provided with any suitable valve 27 and leads into an activated sludge aerator 30. The aerator may comprise the customary tank provided with side walls 31 and hopper bottom 32. The aerator, or activator as it is commonly called, is also provided with an effluent launder 33, communicating with an effluent conduit 34. In the central part of the basin I provide a customary circulator and agitator means which may comprise an updraft tube 35 in spaced relationship to the bottom of the tank and supported by any suitable means, such as legs 36. In the upper portion of the updraft tube is an impeller 37, driven by any suitable means such as a motor 38, to cause a circulation of liquid upwardly through the draft tube, from whence it is sprayed over the surface of the liquid within the aeration tank 30.

The effluent conduit 34 is preferably provided with a pump 40 and leads to a mixing chamber 41. A raw sewage conduit 42 likewise discharges into the mixing chamber 41 in which the effluent from the activated sludge aerator and the raw sewage are thoroughly mixed. The mixture then passes through conduit 43 into the loading well 23 of the clarification chamber.

The operation of the apparatus will be readily understood. Incoming raw sewage and effluent from the activated sludge aerator are mixed in the mixing chamber 41 and pass into the loading well 23 of the clarification chamber 10. In the clarification chamber the heavier solids settle to the bottom where they are scraped to the sludge sump 18 and withdrawn through the conduit 19. A large portion of the liquid containing a large amount of finer suspended solids is withdrawn through the conduit 24 continuously and passes into the activated sludge aerator 30. In the aerator the liquid is subjected to the usual aeration process for a considerable period. As is common in the activated sludge process, I prefer that the average retention time in the aerator be sufficient to provide for adequate purification of the liquid. Part of the liquid in the activated sludge aerating chamber 30 is withdrawn continuously and mixed with more raw sewage and the treatment repeated. Clarified liquid from the clarification tank is withdrawn through conduit 14 to waste.

It will be noted that I provide no secondary clarification chamber as is customary in the prior art. I return all of the aerator effluent to the clarifier 10 which corresponds to the primary clarifier of the prior art. The mixing of the aerator effluent with raw sewage provides many improved results. This effluent is, of course, exceedingly rich in active oxidizing organisms, and when mixed with fresh sewage has a beneficial effect both in the settling of the sludge therefrom and in the purification thereof. A sufficient portion of the activated material can be returned to the aerator and in this manner supplies the aerator with a mixture of freshly aerated solids and fresh sewage. The withdrawal can be at a point and in an amount to provide sufficient concentration of solids in the liquid to be treated.

One improvement lies in the fact that I do not settle sludge from the aerator effluent and then re-suspend the solids in such sludge and later endeavor to re-sediment. It is well known that it is difficult and it requires considerable time and effort to re-suspend the sedimented solids and, likewise, to re-sediment them when it is desired to do so. In my process solids are sedimented or settled into a sludge only once, and that is in the primary clarifier from whence such sludge is removed to waste. It will be noted that I remove from the clarifier into the aerator a suspension of liquid containing solids which have never settled and thereby become compacted and anaerobic. The liquid which I pass from the clarifier into the aerator contains solids which are in the process of sedimentation but have not yet reached a state of rest. Such solids are much more easily handled and have not lost their capacity as flocculating agents. I have been enabled, therefore, to save time and energy by avoiding the re-suspension of sedimented solids, and the resedimentation thereof.

Manifestly, many modifications and variations of the invention hereinbefore set forth may be made by persons skilled in the art without departing from the spirit and scope thereof. Thus, for example, the mixing chamber can be eliminated and any of the various types of aerators could be used in the process of my invention. Accordingly, the appended claims are to be given an interpretation commensurate with the novelty herein described and as broad as may be permitted by the prior art.

I claim:

1. In the activated sludge process for treating sewage wherein raw sewage is subjected in sequence to the steps of sedimentation of solids from the raw sewage, aeration of the clarified sewage in admixture with activated sludge and finally sedimentation of solids from the aerated mixed liquor, the improvement which comprises passing raw sewage into a primary sedimentation zone, withdrawing clarified liquid to waste from siad sedimentation zone, withdrawing settled solids to waste from said sedimentation zone, and withdrawing a portion of the sewage containing a very substantial amount of activated sludge solids suspended therein from said sedimentation zone and passing such withdrawn portion with said suspended solids to an aeration zone, aerating and agitating said withdrawn sewage and contained solids in said aeration zone, and returning substantially all of the aerated sewage prior to removing solids therefrom directly back to the primary sedimentation zone.

2. An activated sludge sewage treatment process comprising the steps of mixing raw sewage with effluent from the subsequent aeration step of the activated sludge process, passing the mixed sewage and effluent through a sedimentation zone, withdrawing clarified liquid to waste from the upper part of said sedimentation zone, withdrawing settled solids to waste from the lower part of said sedimentation zone, withdrawing a predetermined portion of said mixed sewage and effluent containing unsedimented activated material from an intermediate part of said sedimentation zone, aerating and agitating said withdrawn mixed sewage and effluent in an aerating zone, and returning all the liquid that has been aerated and agitated in said aeration zone with contained activated material to said first mixing step.

3. Activated sludge sewage treating apparatus comprising a settling tank having an inlet for raw sewage to be treated, an outlet for clarified liquid to waste, an outlet for settled sludge to waste, an outlet for partially clarified liquid remote from said outlets for clarified liquid and settled sludge; an activated sludge aerator having an inlet and an outlet, means for aerating liquid during its passage through said aerator; and means comprising conduits leading from the said outlet for partially clarified liquid to the aerator inlet and from the aerator outlet back to the raw sewage inlet and pumping means in one of said conduits for circulating liquid from the settling tank to and through the aerator and back to the raw sewage inlet of the settling tank.

4. Apparatus for the activated sludge treatment of sewage comprising a settling tank having an inlet for raw sewage to be treated, a clarified liquid outlet from the upper part of said tank, a settled sludge outlet from the lower part of said tank, an outlet intermediate said first mentioned outlets for withdrawing partially clarified sewage carrying substantial amounts of activated sludge, an activated sludge aerator having an inlet communicating with said intermediate outlet of said settling tank, means within said aerator for aerating and agitating liquid during its passage through said aerator, an outlet from said aerator communicating with the inlet of said settling tank, and pumping means for maintaining a cyclic flow of sewage through said aerator.

5. The apparatus of claim 3 containing in addition thereto means in advance of said settling tank for mixing raw sewage and effluent from said aerator prior to sedimentation in said settling tank.

6. In the treatment of sewage by the activated sludge process, the steps which comprise continuously flowing raw sewage into a sedimentation zone, subjecting the sewage in said sedimentation zone to the action of aerobic bacteria contained in a body of previously treated sewage returned from a subsequent treating step to said sedimentation zone, continuously withdrawing clarified effluent to waste from said sedimentation zone, withdrawing settled sludge to waste from said sedimentation zone, continuously withdrawing partially treated and clarified sewage containing solids in suspension and aerobic bacteria from a zone in said sedimentation zone remote from the points of withdrawal of clarified effluent and settled sludge, flowing said withdrawn sewage with contained solids and bacteria into an aeration zone, aerating the sewage in said aeration zone and submitting it therein to sufficient agitation to keep said solids in suspension in said sewage, and continuously returning at least the major portion of said aerated sewage containing solids in suspension and aerobic bacteria from said aeration zone to said sedimentation zone.

7. The improvement in the activated sludge process of treating sewage that resides in returning the unsedimented effluent from the aeration zone to the inlet of the primary clarification zone to pass again therethrough with entering raw sewage, whereby the raw sewage is given a prolonged initial activated sludge treatment in said clarification zone, withdrawing sewage from one point in said clarification zone while still containing a substantial amount of activeted sludge suspended therein and passing this withdrawn sewage into and through the aeration zone, withdrawing clarified sewage to waste from another point in said clarification zone and withdrawing deposited solids from a third point in said clarification zone.

8. The improvement in the activated sludge process of sewage purification that resides in diluting the raw sewage entering the primary clarification zone with unsedimented mixed liquor from the aeration zone of the process, whereby the raw sewage will be subject to substantial activated sludge treatment while passing through said clarification zone, withdrawing sewage from one level in said clarification zone, said withdrawn sewage containing substantial amounts of suspended activated sludge solids, passing the withdrawn sewage and contained solids into and through an aeration zone, returning the aerated mixed liquor issuing from said aeration zone to the primary clarification zone to effect said dilution and primary treatment of raw sewage, withdrawing clarified sewage to waste from another level in said clarification zone, and withdrawing deposited solids from a third level in said clarification zone.

9. In the activated sludge process of sewage treatment wherein sewage is first passed through a primary settling zone, then aerated in admixture with activated sludge in an aeration zone, and the aerated mixed liquor then clarified, the improvement which resides in providing the activated sludge for the aeration zone by returning all the aerated mixed liquor from the aeration zone to the primary settling zone and passing partly settled sewage containing activated sludge solids in suspension from one level in said primary settling zone into said aeration zone, withdrawing to waste all the sludge which is being wasted in the process from another level in said primary settling zone, and withdrawing to waste clarified liquid from still another level in said primary settling zone.

10. In apparatus for the treatment of sewage by the activated sludge process including a settling tank, a raw sewage inlet into said settling tank, a sludge outlet from the lower part of the settling tank, a clarified sewage outlet from the upper portion of the settling tank, an activated sludge aerator, an inlet into said aerator, and means in said aerator for aerating sewage during its passage therethrough: a third outlet from an intermediate portion of the settling tank communicating with said inlet into the aerator, an outlet from the aerator communicating with the said raw sewage inlet to the settling tank, and pumping means for causing continuous flow of sewage from said settling tank to and through said aerator and back to said settling tank.

JOHANNA GUNZ.